US009586680B2

(12) United States Patent
Mondet

(10) Patent No.: US 9,586,680 B2
(45) Date of Patent: Mar. 7, 2017

(54) ROTOCRAFT ROTOR INCLUDING A FLAPPING ABUTMENT MECHANISM FOR BLADES HINGED ON A HUB OF THE ROTOR

(71) Applicant: AIRBUS HELICOPTERS, Marignane (FR)

(72) Inventor: Jean Mondet, Pelissanne (FR)

(73) Assignee: AIRBUS HELICOPTERS, Marignane (FR)

( * ) Notice: Subject to any disclaimer, the term of this patent is extended or adjusted under 35 U.S.C. 154(b) by 1065 days.

(21) Appl. No.: 13/693,192

(22) Filed: Dec. 4, 2012

(65) Prior Publication Data
US 2013/0149149 A1 Jun. 13, 2013

(30) Foreign Application Priority Data

Dec. 7, 2011 (FR) ...................... 11 03738

(51) Int. Cl.
*B64C 27/57* (2006.01)
*B64C 27/32* (2006.01)

(52) U.S. Cl.
CPC ............ *B64C 27/57* (2013.01); *B64C 27/322* (2013.01)

(58) Field of Classification Search
CPC .............................. B64C 27/322; B64C 27/57
USPC ................... 416/46, 51, 53, 140, 141, 134 A
See application file for complete search history.

(56) References Cited

U.S. PATENT DOCUMENTS

| 2,475,333 | A | * | 7/1949 | Morris | .................. | B64C 27/001 |
| | | | | | | 416/140 |
| 2,946,391 | A | * | 7/1960 | Lemont, Jr. | ........... | B64C 27/322 |
| | | | | | | 416/140 |
| 4,652,210 | A | * | 3/1987 | Leman | .................. | B64C 27/322 |
| | | | | | | 416/134 A |
| 5,588,801 | A | | 12/1996 | Commelin | | |
| 5,820,341 | A | | 10/1998 | Mondet | | |

(Continued)

FOREIGN PATENT DOCUMENTS

| FR | 2725687 A1 | 4/1996 |
| FR | 2742725 A1 | 6/1997 |
| FR | 2885115 A1 | 11/2006 |

OTHER PUBLICATIONS

Search Report and Written Opinion; Application No. FR. 1103738; dated Jul. 18, 2012.

*Primary Examiner* — Richard Edgar
*Assistant Examiner* — Jesse Prager
(74) *Attorney, Agent, or Firm* — Brooks Kushman P.C

(57) ABSTRACT

An abutment mechanism for limiting the flapping of the blades of a rotor (1). High abutment members (6) can be moved into an engagement position by return means (13) exerting an intrinsic return force (R), and into a disengagement position by a flyweight (10) exerting a centrifugal force (C) under the effect of the rotor (1) rotating. At least one magnetic type bistable latch (15) is in selective engagement with the high abutment members (6). When the rotor (1) is stationary and while it is starting to rotate, an engagement latch (15) engages with the high abutment member (6) to prevent it passing from the engagement position towards the disengagement position. At a predetermined centrifugal force threshold, the engagement of the engagement latch (15) with the high abutment member (6) is broken, and the high abutment member (6) quickly passes into the disengagement position.

19 Claims, 5 Drawing Sheets

(56) References Cited

U.S. PATENT DOCUMENTS 7,462,015 B2 * 12/2008 Mazet .................. B64C 27/322
416/140
2007/0059175 A1 3/2007 Mazet

* cited by examiner

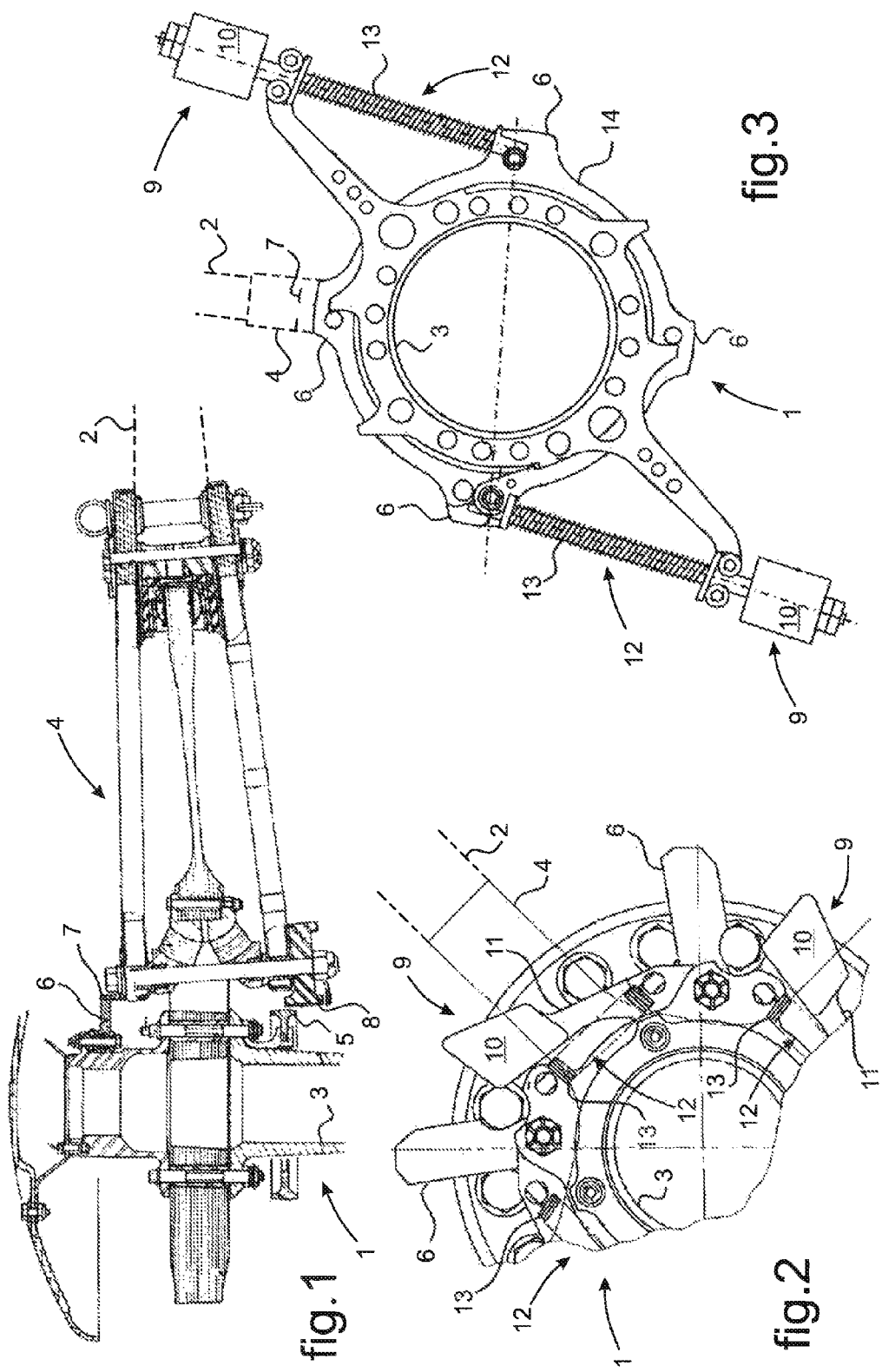

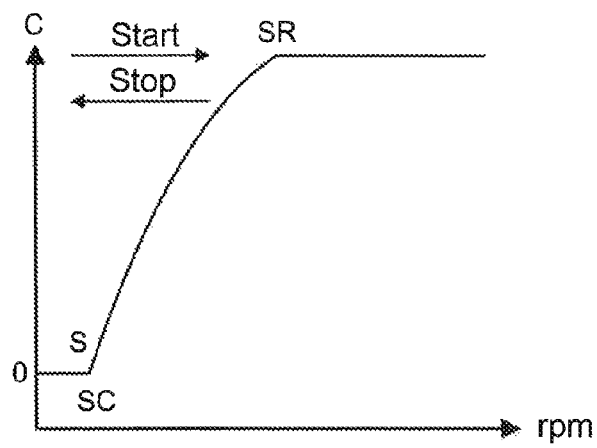
fig.4
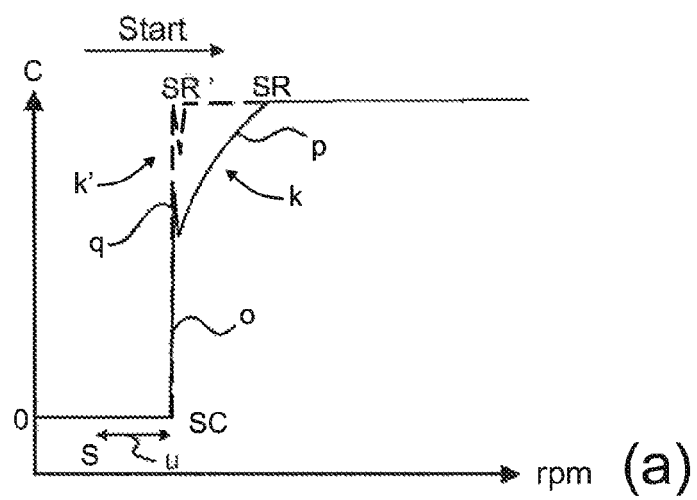
(a)
fig.5
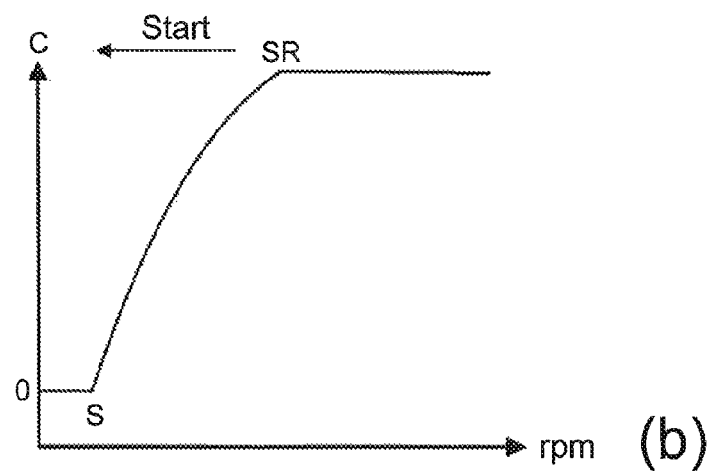
(b)

ROTOCRAFT ROTOR INCLUDING A FLAPPING ABUTMENT MECHANISM FOR BLADES HINGED ON A HUB OF THE ROTOR

CROSS REFERENCE TO RELATED APPLICATIONS

This application claims priority to French patent application No. FR 11 03738 filed on Dec. 7, 2011, the disclosure of which is incorporated in its entirety by reference herein.

BACKGROUND OF THE INVENTION (1) Field of the Invention

The present invention relates to the field of rotors having hinged blades for rotorcraft fitted with at least one main rotor providing lift and propulsion, and more particularly helicopters. The present invention relates more specifically to mechanisms fitted to such rotors in order to limit the flapping path of blades of a rotary wing constituted by the rotor.

(2) Description of Related Art

The present invention provides such a mechanism that uses abutment members that oppose movement of the blades in flapping. The mechanism is more particularly of the type in which the abutment members are drivable by opposing drive means between two positions. One of the drive means uses centrifugal force to cause the abutment members to be retracted, while the other drive means relies on a spontaneous return of the abutment members to their initial position for limiting the flapping path of the blades.

The present invention also provides a rotorcraft rotor constituting a rotary wing that has blades hinged on a hub of the rotor and that is fitted with such an abutment mechanism for limiting the flapping path of the blades.

Helicopters are rotorcraft that are fitted with at least one main rotor providing the helicopter with both lift and propulsion. The rotor under consideration for the present invention comprises in particular a rotary wing having a plurality of blades, each blade being individually hinged to a rotary hub, with the blades being radially distributed around the axis of rotation of the hub. The blades are generally planar elongate elements, each carried at one end by the hub so that they extend transversely relative to its axis of rotation. Hinged mounting of blades on the hub is obtained by intermediate mounting members, each presenting individual freedoms of movement for the blades relative to the hub.

The mounting members respectively fitted to each of the blades at their ends engaging the hub allow the blades to be controlled by an operator, in particular a pilot. Hinged mounting of blades on the hub allows the helicopter pilot in flight to cause the pitch of the blades to vary collectively and/or cyclically in order to control the behavior of the rotorcraft relative to its lift and/or its propulsion.

The blades are free to move on the hub upwards and downwards. The concept of up and down should be considered relative to the orientation of the axis of rotation of the rotor when installed in position on a helicopter. When the rotor is rotating at nominal speed, the blades are spontaneously moved upwards under the effect of centrifugal force so as to be perpendicular relative to the axis of rotation of the rotor. When the rotor is stationary, the blades are not subjected to any centrifugal force and they naturally droop downwards under the effect of their own weight.

It is necessary to hold the blades flat when the rotor is stationary and to prevent them from flapping in order to preserve them. Flapping of the blades should also be avoided while the rotor is starting. Such flapping of the blades can be caused by the effect of forces external to the helicopter, e.g. induced by strong wind or by gusting, or indeed by the movements of a ship having the helicopter on board.

The rotor is thus commonly fitted with an abutment mechanism that limits the flapping path of the blades under the effect of forces external to the helicopter. For each blade, the abutment mechanism comprises a low abutment member and a high abutment member, which members form obstacles on the individual flapping paths of the blades respectively downwards and upwards. The abutment members co-operate with corresponding contact members forming parts of the members for hinge-mounting of the blades on the hub.

When the rotor is used to procure lift and/or propulsion for a helicopter, the high abutment members must not constitute an obstacle for upward movement of the blades. Such movement of the blades must be allowed while the rotor is in operation in order to allow the pilot to operate the blades by varying their pitch cyclically or collectively.

It is therefore necessary to provide means for retracting the high abutment members while the rotor is in operation. Nevertheless, account must be taken of the advisability of limiting flapping movement of the blades during a rotor starting stage.

The high abutment members are also used for preventing the blades from moving in the event of the blades being folded sideways in order to facilitate transporting and/or storing the helicopter. It must be possible to fold the blades sideways without significant inconvenience, and conversely it must be possible to deploy the blades quickly in order to put the helicopter into operation.

Consequently, the abutment mechanism includes a device for blocking the high abutment members against corresponding contact surfaces included in the mounting members. The high abutment members are movable on the hub between two positions. A first position is an engagement position in which the high abutment members are engaged against the corresponding contact members for limiting the freedom of the blades to move in flapping while the rotor is stationary between the low abutment members and the high abutment member associated therewith. A second position is a position in which the high abutment members are disengaged, thereby allowing the blades to move freely in upward flapping.

The high abutment members are carried by the hub via movement means, e.g. comprising a ring that carries all of the high abutment members and that is mounted to turn about the hub. In another embodiment, the high abutment members may be mounted to be individually movable in pivoting on a collar at the periphery of the hub.

The blocking device includes opposing drive means for moving the high abutment members between said engagement and disengagement positions. The drive means are suitable for being engaged on a common member for moving the high abutment members together, e.g. via such a said ring. When the high abutment members are mounted to be individually movable on the hub, the drive means may for example likewise be individually associated with each of the high abutment members.

The centrifugal force due to the rotor being set into rotation is advantageously used to cause the high abutment members to be retracted. Making use of centrifugal force in this way serves in particular to obtain the advantage of being adapted to starting the rotor in a high wind or when the wind is gusty, while using an organization for the drive means that is simple.

Beyond a predetermined threshold of rotor rotation, the high abutment members are spontaneously driven into the disengagement position. Conversely, while stopping the rotor, the centrifugal force that was being used lessens and allows the high abutment members to go to the engagement position. In order to avoid the blades from flapping during the terminal stage of stopping the rotor, return means are used to force the high abutment members to pass into the engagement position.

Consequently, the drive means comprise two opposing drive means for driving the high abutment members, respectively to the disengagement position and to the engagement position.

First drive means for the high abutment members are of the centrifugal force type for causing the high abutment members to move spontaneously into the disengagement position under the effect of the centrifugal force caused by the rotor rotating. The first drive means typically make use of at least one flyweight that is carried by a lever arm engaged with the hub and with the high abutment members. The engagement of the lever arm with the high abutment members may be individual or collective, depending on the above-mentioned variant ways of organizing said movement means.

Second drive means for the high abutment members oppose the forces generated by the first drive means. The second drive means are advantageously of the spontaneous rated return means type for returning the high abutment members to the engagement position. The second drive means generate a spontaneous return of the high abutment members to the engagement position as soon as the centrifugal force used by the first drive means lessens below a predetermined threshold. The rated return means are typically elastically deformable means, such as a compression spring, a traction spring, and/or a torsion spring, for example.

While the rotor is being put into rotation, centrifugal force as a result of the rotation causes the first drive means to tend to entrain the high abutment members to the disengagement position. A return force exerted by the second drive means opposes premature passage of the high abutment members to the disengagement position, so long as the said corresponding force threshold is not reached.

Conversely, while the rotor is stopping, there is a lessening of the centrifugal force used by the first drive means. This lessening reduces the ability of the first drive means to oppose the return force generated by the second drive means. From the corresponding force threshold, the centrifugal force lessened by the slowing of the rotor allows the high abutment members to move towards the engagement position under the effect of the return force that has become greater than the centrifugal force. In the absence of the rotor being set once more into rotation, the return force keeps the high abutment members in the engagement position.

For information about a technological environment that is close to the present invention, reference may be made for example to the following documents: FR 2 885 115 (Eurocopter France); and FR 2 725 687 (Eurocopter France); which documents describe such abutment mechanisms for a helicopter rotor, suitable for providing a flapping limit for hinge-mounted blades on a hub of the rotor.

In the course of using such abutment mechanisms, it has been found that they could be improved, both in terms of their operation and in terms of preserving mechanical parts of the rotor.

A retraction stage is identified during which the high abutment members are retracted from their engagement position to their disengagement position. This retraction stage extends over a corresponding duration while the speed of rotation of the rotor is increasing on starting, until the high abutment members are indeed placed in the disengagement position. During the retraction stage, mechanical parts in contact with the abutment mechanism are subjected to harmful stresses or impacts that damage them, particularly in the presence of a high wind or of gusts of wind urging the blades upwards.

Such stresses arise more particularly during a transient step of the retraction stage, in which the high abutment members are set into movement in order to escape from the contact members that they engage in the engagement position. The transient step extends from the instant at which disengagement of the high abutment members is initiated, until the disengagement is complete.

It is desirable for the passage of the high abutment members from the engagement position to the disengagement position to be as fast as possible once their movement has been initiated.

BRIEF SUMMARY OF THE INVENTION

The object of the present invention is to propose an abutment mechanism that limits the flapping path of the blades of a main rotor for a rotorcraft. The rotor is more specifically a rotor having blades hinged to a hub of the rotor and is of the type that is organized for fitting to a helicopter or to an analogous rotorcraft.

The present invention seeks more particularly to provide such an abutment mechanism that has a structure that is organized to avoid the drawbacks induced by said transient step, preserving the mechanical parts of the abutment mechanism as well as possible. It is also desired to improve the operation of the abutment mechanism.

It is also desired to improve the blocking of the high abutment members in the engagement position when the rotor is stationary. Such an improvement seeks in particular to limit as well as possible the freedom of the blades to move in flapping while the rotor is stationary and/or while rotation of the rotor is being initiated during a stage of starting the rotor.

The looked-for improvement in the blocking of the high abutment members in the engagement position should be obtained without providing any obstacle to the way in which the abutment mechanism operates, and possibly even while improving the performance of the abutment mechanism in operation. Specifically, the operation concerned relates in particular to the high abutment members being caused to move away from either one of the engagement and disengagement positions to the other.

The looked-for improvement in the blocking of the high abutment members in the engagement position must not impede the main objective based on the high abutment members moving quickly into the disengagement position as soon as they have started to be moved under the effect of centrifugal force.

The looked-for improvement in the operation of the abutment mechanism must not lead to the structure of the abutment mechanism becoming significantly more complex. It is appropriate to ensure that the blades can be folded sideways quickly, and conversely that they can be deployed quickly. Putting the rotor quickly into service must not be affected by the structure of the abutment mechanism being made complex.

According a reasoning of the present invention, two distinct transient force thresholds having an influence on the operation of the abutment mechanism are observed during the transient stage.

It should be recalled that the resilient-deformation means generate a return force that varies depending on the extent to which the return means are deformed. A large amount of deformation of the return means gives rise to a large return force, and vice versa.

A first transient force threshold is observed that corresponds to a centrifugal force threshold beyond which drive of the high abutment members towards the disengagement position is initiated against the return force that the return means generate intrinsically at a first deformation threshold.

A second transient force threshold is observed that corresponds to a centrifugal force beyond which the desired escape of the abutment members into the disengagement position is actually obtained. The centrifugal force generated at the second transient force threshold corresponds to a centrifugal force that is sufficient to overcome a return force corresponding to a second deformation threshold of the return means. The second deformation threshold of the return means is greater than the first deformation threshold.

It is also observed that said second transient force corresponds to a return force threshold beyond which the centrifugal force as lessened during the stage of stopping the rotor is no longer suitable for preventing the high abutment members passing from the disengagement position to the engagement position.

Finally, it is found that the duration of the transient stage depends on the action of the return means against the high abutment members passing from the engagement position to the disengagement position. Such action depends on the return force that is generated intrinsically by the return means at the first transient threshold, opposing the passage of the high abutment members to the disengagement position.

On the basis of said reasoning of the present invention, the present invention proposes breaking the strict dependency of said return force threshold and said centrifugal force threshold relative to the ability of the return means to oppose the centrifugal forces causing the high abutment members to move away from the engagement position towards the disengagement position, and conversely away from the disengagement position towards the engagement position.

More particularly, the present invention proposes conserving return means of the elastic deformation type for the second drive means. Such return means are advantageous in terms of reliability for driving the high abutment members towards the engagement position against the lessened centrifugal force, as soon as the force threshold is reached. Such return means are also advantageous in terms of the simplicity of their structure, and of their costs of procurement and of mounting on the rotor, which costs are competitive.

On the basis of this choice and as a departure from common practice in the field of rotorcraft, the present invention proposes organizing the abutment mechanism by making a distinction between the various effects produced by the return means.

Traditionally, during a stage in which the rotor is starting and at the first transient force threshold, a first effect of the return means is to retain the high abutment members resiliently against being driven towards the disengagement position. This resilient retention continues so long as the centrifugal force generated by the first drive means remains below said second transient force threshold.

Conversely, during a stage in which the rotor is being stopped and at the second transient force threshold, a second effect of the return means is to drive the high abutment members towards the engagement position under the effect of the return force that they generate intrinsically. The return means are allowed to drive the high abutment members providing the centrifugal force generated by the first drive means is below a previously defined return force threshold corresponding to the return force that is intrinsically generated by the return means at the second transient force threshold.

The abutment mechanism of the present invention has specific means for retaining the high abutment members preferably at least in the engagement position, and possibly also in the disengagement position. This specific feature of the retaining means should be considered as being provided by at least one bistable latch that is distinct from the return means. An engagement latch is associated with the return means in order to retain the high abutment members in the engagement position against the centrifugal force generated by the first drive means. Conversely, a disengagement latch is optionally also associated with the return means for retaining the high abutment members in the disengagement position against the return force that is intrinsically generated by the second drive means.

Such a latch is understood as a member for holding the high abutment members completely stationary in the engagement position or the disengagement position, as the case may be. In the engagement position, the engagement latch opposes the centrifugal force generated by the first drive means. In the disengagement position, the disengagement latch opposes the return force intrinsically generated by the second drive means.

While the rotor is being started, the engagement latch holds the high abutment members firmly in the engagement position so long as the centrifugal force threshold is not reached by the first drive means. Conversely, while the rotor is being stopped, the disengagement latch opposes the return force generated by the second drive means until a determined return force threshold has been reached. Control means that operate independently on detecting the centrifugal force corresponding to the return force threshold can be used for causing the disengagement latch to pass from the active state to the inactive state.

The term "latch" should be understood as designating any bistable member having two functional states constituting all or nothing alternatives. A first functional state corresponds to an active state of the latch that prevents any movement of the high abutment members. A second functional state corresponds to an inactive state of the latch that allows the high abutment members to move freely relative to the latch.

Passage of the high abutment members to the disengagement position depends on the retaining force generated by the engagement latch in the active state. The departure of the engagement latch from its active state and its passage to the inactive state depend on the centrifugal force generated by the first drive means corresponding to the centrifugal force threshold.

Conversely, the passage of the high abutment members to the engagement position depends on the retaining force generated by the disengagement latch in the active state. The departure of the disengagement latch from its active state and its passage to the inactive state depend on detecting the centrifugal force generated by the first drive means corresponding to the return force threshold.

The engagement latch in the active state prevents any deformation of the return means until the centrifugal force threshold is reached. While the engagement latch is in its active state, the return force intrinsically generated by the return means has no effect on the movement of the high abutment members.

At the transient step, when the centrifugal force threshold is reached by the first drive means, the engagement latch passing into the inactive state allows the return means to deform rapidly under the effect of the centrifugal force produced by the first drive means. The rapidity of the deformation of the return means is obtained under the effect of initially preventing the return means from deforming while the engagement latch is in the active state. This initial prevention is implemented by the engagement latch, including in particular when the centrifugal force generated by the first drive means is itself sufficient to cause the return means to deform.

The duration of the transient stage while the rotor is starting no longer depends on the ability of the centrifugal force to progressively oppose deformation of the return means under the effect of the progressively increasing speed of rotation of the rotor.

The all or nothing change of state of the engagement latch from its active state to its inactive state releases the high abutment members to move and allows them to be driven by the centrifugal force that increases while the rotor is starting. When it is in its inactive state, the engagement latch releases movement of the high abutment members, which members are quickly driven by the first drive means for which initial deformation was prevented by the engagement latch being in its active state.

The fast drive of the high abutment members results from a centrifugal force exerted on the high abutment members that corresponds to a centrifugal force threshold greater than said first deformation threshold of the return means. The second transient force threshold obtained on the basis of the provisions of the present invention is made to be greater than a first transient force threshold that, in the absence of the latch, would correspond to said first deformation threshold of the return means.

The duration of the transient stage is minimized and the high abutment members are driven quickly from the engagement position in which they were firmly held by the engagement latch into the disengagement position. The fast drive of the high abutment members is obtained under the effect of a centrifugal force at the centrifugal force threshold that is significantly greater than the return force that is intrinsically generated by the return means and that corresponds to said first deformation threshold.

It should be considered that the above-specified provisions relating to the operation of the engagement latch can be transposed, where appropriate, in analogous manner to the disengagement latch. The duration of the transient stage is minimized while the rotor is being stopped on the basis of the high abutment members being driven quickly into the engagement position from the engagement position in which the high abutment members are firmly held by the disengagement latch.

In the absence of a disengagement latch, and as conventionally occurs during a stage in which the rotor is being stopped, the drive of the high abutment members towards the engagement position depends on the return force threshold from which the centrifugal force is no longer sufficient to oppose the return force that is intrinsically generated by the return means under the effect of their deformation induced by the high abutment members passing into the disengagement position.

The departure of the engagement latch from its inactive state and its passage to the active state depend on the high abutment members being driven to the engagement position by the return means. When the rotor is in the stationary state, the high abutment members are held in the engagement position with assistance from the engagement latch.

When the abutment mechanism operates while using only the engagement latch, it should be recalled that the return force threshold is intrinsic to the return means and that the centrifugal force threshold must be suitable for opposing the return force generated by the return means.

The retention of the high abutment members by the engagement latch continues during the increase in the speed of rotation of the rotor until the first drive means generate a centrifugal force corresponding to the centrifugal force threshold. The centrifugal force threshold should correspond as well as possible to the ideal rotor drive speed threshold that is just sufficient to allow the blades to move on the hub during a stage in which the rotor is being started.

The centrifugal force threshold determines the retaining force generated by the engagement latch in the active state, and it corresponds in particular to the sum of the return force intrinsically generated by the return means on initiation of the transient stage, plus the retaining force.

A compromise needs to be found between the respective abilities of the return means and of the engagement latch to oppose the centrifugal force. This compromise must take account of the search for a centrifugal force threshold that is as close as possible to the threshold that corresponds to the ideal rotor drive speed threshold.

The compromise should optionally take account of another constraint relating to a bounce phenomenon of the high abutment members. Said bounce phenomenon may be induced at the transient step by the high abutment members passing quickly into the disengagement position.

The extension of return means constituted by elastically deformable means has the reputation of being naturally unstable. Such instability is made worse by causing the return means to deform quickly at the centrifugal force threshold. Such rapid deformation of the return means is obtained as from a centrifugal force threshold that is significantly higher than the return force that is intrinsically generated by the return means at the centrifugal force threshold, and in particular as from a centrifugal force that corresponds to the return force plus the retaining force.

Account must also be taken of how the engagement latch is organized since its structure must be as simple as possible in order to avoid excessively complicating the structure of the abutment mechanism.

In a first approach, the departure from conventional dependency between the return force threshold and the centrifugal force threshold makes it possible to take account of the various intrinsic stiffness conditions of the return means so as to cause the high abutment members to pass respectively into the engagement position and into the disengagement position.

While the rotor is being started, the conditions for passing the high abutment members into the disengagement position are associated with a flapping limit for the blades until the rotation of the rotor has reached a sufficient threshold. Account should be taken of the fact that this starting stage may well be performed while potentially large external forces are acting on the helicopter, such as a strong wind or a wind that is gusty.

It is possible for the conditions for the high abutment members passing into the engagement position to be less constraining, with that procuring the advantage of making it possible to define a minimized return force threshold. The stiffness of the return means may be selected using various solutions. Where appropriate, these solutions may be associated with using a said disengagement latch, depending on the result that is to be obtained.

According the said first approach, the return force threshold may be significantly less than the centrifugal force threshold. In this approach, preference is given to reducing the duration of the retraction stage and to optimizing the retaining force. Since the engagement latch is used to keep the high abutment members firmly in the engagement position when the rotor is stationary, the return means may present minimum power that is just sufficient to drive the high abutment members into the engagement position against the remaining centrifugal force that is potentially much less than the centrifugal force threshold.

Under such circumstances, the retaining force is potentially optimized for a centrifugal force threshold that is just sufficient and corresponds with the ideal rotation speed threshold for the rotor. When the transient step is initiated, the retaining force is immediately inhibited and the centrifugal force is suitable for causing rapid deformation of the return means that present minimized ability to oppose the centrifugal force.

In a second approach, it is appropriate to take advantage of the presence of the return means for incorporating damper means in the abutment mechanism. The return means can easily incorporate such damper means for opposing any bounce phenomenon that might be induced under the effect of the high abutment members passing rapidly into the disengagement position during the transient step.

In a variant, advantage may be taken of a said disengagement latch for incorporating said damper means.

In a third approach, account may be taken of a potential failure of the engagement latch to pass from the active state to the inactive state depending on the organization selected for the latch. Such a failure of the engagement latch should be envisaged in particular in the event of the retaining force generated by the engagement latch not being a retaining force that is intrinsic to the latch. According this said third approach, the return means generate an intrinsic return force suitable for opposing the passage of the high abutment members into the disengagement position so long as an acceptable centrifugal force threshold has not been reached while the rotor is in a starting stage. The acceptable centrifugal latch threshold is less than the centrifugal force threshold corresponding to the sum of the retaining force plus the return force generated by the return means at the centrifugal force threshold. The return means are suitable for causing the high abutment members to pass into the engagement position at the acceptable centrifugal force threshold. The return means themselves suffice for obtaining satisfactory retention of the high abutment members in the engagement position. In the context of implementing the abutment mechanism by using the centrifugal force threshold that is acceptable in the event of the engagement latch failing, the transient stage takes place in a manner analogous to that which is conventionally performed.

In order to reconcile the three above-mentioned approaches, while also taking account of a simplification of the structural organization of the engagement latch, it is proposed to organize the engagement latch as magnetic type means. The attraction force of such magnetic type means enables the retaining force to be rated accurately as a function of specific needs relating to a compromise that is to be defined between the various approaches in question.

A magnetic type engagement latch comprises more particularly at least one set of two co-operating magnetic members, respectively carried by the rotor hub and by the high abutment members.

A magnetic type latch also presents the advantage of being easily operated and easily implanted on the rotor, regardless of the way in which the means for moving the high abutment members are organized on the rotor hub. Depending on the way in which the means for moving the high abutment members are arranged on the rotor hub, each magnetic member allocated to a high abutment member may be carried individually by the corresponding high abutment member, or a common magnetic member may be allocated collectively to all of the high abutment members.

In a preferred embodiment of the engagement latch, at least one of the co-operating magnetic members is of the permanent magnet type. A permanent magnet should be considered as being a magnetic member that produces an intrinsic and permanent magnetic force corresponding to the retaining force as previously defined with reference to the centrifugal force threshold.

During a stage of starting the rotor, the engagement latch is naturally caused to pass to the inactive state at the transient step, providing the centrifugal latch corresponds to the centrifugal force threshold. Conversely, during a stage of stopping the rotor, the engagement latch is naturally caused to pass to the active state as soon as the high abutment members are driven by the return means into the engagement position.

The engagement latch, and possibly also the disengagement latch may be constituted by electromagnetic means producing a magnetic force that is generated selectively by control means. The passages from the inactive state to the active state in the latch(es) are induced selectively by the control means that cause the latch(es) to be respectively activated or inhibited. Operation of the control means depends on means for evaluating the centrifugal force generated by the first drive means relative to the centrifugal force threshold.

By way of example, such evaluation means may be means for detecting the increasing speed at which the rotor is rotating and/or dynamometer means for measuring the speed of rotation of the rotor.

The latch(es) is/are powered from a remote source, in particular a power supply network on board the rotorcraft, specifically by means of electrical slip rings mounted on the rotor hub.

The electromagnetic type engagement latch may deliver any level of intrinsic power, providing said power is suitable for developing at least the retaining force. This intrinsic power of the engagement latch may be greater than that needed at the centrifugal force threshold, with the retaining force that corresponds to the centrifugal force threshold being limited by the control means inhibiting the retaining means, depending on the centrifugal force as determined by the evaluation means.

An intrinsic power for the engagement latch greater than that which is just necessary at the centrifugal force threshold is advantageously made use of to reinforce the retention of the high abutment members in the engagement position when the rotor is stationary.

As mentioned above, rapid release of the return means at the transient state gives rise to oscillations in the return means induced by their instability in deformation. Rapid release of the return means might generate an inappropriate bounce phenomenon of the high abutment members, which phenomenon should be avoided.

A proposed solution is to provide the abutment mechanism with damper means for damping the movement of the high abutment members towards the disengagement position. Several variant embodiments of the damper means are proposed, that may be used in isolation or in combination.

In one variant, the damper means are incorporated in the return means.

In another variant, the damper means are formed by damper members, such as members formed by flexible elements placed on a path corresponding to the movement of the high abutment members towards the disengagement position. By way of example, such a path is the path followed by at least one of the high abutment members or analogously, and where appropriate, the path followed by a ring that carries the high abutment members jointly.

In another variant, advantage may be taken of the disengagement latch for fitting it with such damper means.

According a general definition of the abutment mechanism of the present invention, the abutment mechanism is arranged for fitting to a rotorcraft rotor, in particular for a helicopter. The rotor comprises a rotary wing with a plurality of blades. Each blade is individually hinged to a hub of the rotor via a respective mounting member that allows the pitch of the blades to be varied cyclically or collectively. The rotor is in particular a main rotor of a helicopter.

In the context of the present invention, the particular ways in which the members mounting the blades on the hub with freedom to move and the particular means for moving the blades to make them vary their pitch are immaterial. The present invention relates to the arrangement of the abutment mechanism that limits the flapping movements of the blades, and that is suitable for being fitted to a helicopter rotor regardless of the way in which the blades are hinge-mounted on the hub and moved relative thereto.

The abutment mechanism includes abutment members that are mounted on the hub. The abutment members co-operate with first members carried by the hub, or analogously by the mounting members that it carries. The abutment members include low abutment members and high abutment members, between which the individual flapping path of a blade associated therewith is limited.

The particular ways in which the low abutment members are organized is immaterial with respect to the generality of the present invention, which relates more particularly to the ways in which the high abutment members are moved between an engagement position and a disengagement position.

The high abutment members are mounted to move on the hub between the engagement position and the disengagement position. In the engagement position, the high abutment members co-operate with the corresponding contact members, constituting an obstacle to the upward flapping path of each blade. In the disengagement position, the high abutment members are retracted leaving the upward flapping paths of the blades free.

The abutment mechanism includes drive means for driving the high abutment members between the engagement position and the disengagement position. The drive means comprise first drive means and second drive means that develop opposing forces causing the high abutment members to pass respectively towards the disengagement position, for the first drive means, and towards the engagement position, for the second drive means.

The first drive means make use of centrifugal force induced by setting the rotor into rotation. Said centrifugal force generates a centrifugal force that causes the high abutment members to pass towards the disengagement position as from a predetermined centrifugal force threshold.

In a common embodiment, the first drive means comprise at least one lever arm that engages with the high abutment members and that is provided with a flyweight or an analogous member for making use of the centrifugal force generated by rotating the rotor, and more particularly by rotating the hub.

In one embodiment, each of the high abutment members engages a respective drive arm that is associated therewith.

In another embodiment, the high abutment members are carried jointly by a ring that is mounted to turn on the hub.

The second drive means comprise return means, typically of the type involving elastic deformation, or analogous means. The return means generate a spontaneous return force for returning the high abutment members towards the engagement position against the centrifugal force generated by the first drive means. The return means are means suitable for causing the high abutment members to pass towards the engagement position as from a predetermined return force threshold that corresponds to a predetermined lessening of the centrifugal force generated by the first drive means. The return force threshold is predetermined in particular on the basis of the intrinsic structure of the return means selected depending on requirements.

According to the present invention, the abutment mechanism includes at least one bistable engagement latch that is selectively engaged the high abutment members between an active state and an inactive state. A first stable position of the engagement latch corresponds to an active state of the engagement latch in which it engages with the high abutment members that it keeps blocked in the engagement position if the latch is an engagement latch, and where appropriate in the disengagement position if the latch is a subsidiary disengagement latch. A second stable position of the latch, equally applicable regardless of whether the latch is an engagement latch or a disengagement latch, corresponds to the latch being in an inactive state in which said engagement is broken, allowing the high abutment members free to move independently relative to the latch, regardless of whether it is an engagement latch or a disengagement latch.

The at least one latch included in the abutment mechanism is a functional member of the abutment mechanism suitable for banning, or conversely for allowing, the high abutment members to move on an all or nothing basis under the effect of forces generated respectively by the first drive means and by the second drive means.

Starting from its two stable positions, respectively the active state and the inactive state, the function of the latch is selectively either, in the active state, to block the high abutment members respectively in the engagement position for an engagement latch or in the disengagement position for a disengagement latch, or conversely, in the inactive state, to leave the high abutment members free to move towards the disengagement position for the engagement latch, or towards the engagement position for the disengagement latch.

In the active state, the engagement latch is a member for retaining the high abutment members in the engagement position when the rotor is stationary and during a stage in which the rotor is starting. In the active state, the engagement latch engages the high abutment members causing them to be joined to one another. Putting the high abutment members in the engagement positions at the end of the stage of stopping the rotor causes the engagement latch to pass to the active state by causing the latching members that constitute it and that respectively engage the hub and the high abutment members to come into engagement with each other. In the active state, the engagement latch ensures that the high abutment members are firmly blocked against the corresponding contact members in the engagement position. In a stage during which the rotor is being started, the engagement latch in the active state acts against the centrifugal force generated by the first drive means to prevent any movement of the high abutment members.

When the centrifugal force matches the centrifugal latch threshold the engagement latch is caused to pass from the active state to the inactive state.

Analogously the ways in which the disengagement latch operates can be deduced by transposition from the ways in which the engagement latch operates.

The engagement latch and/or the disengagement latch, when in the inactive state, does not engage with the high abutment members, thereby leaving them free to move relative to the latches. Said non-engagement corresponds to no junction between the latch(es) and the high abutment members. During a stage of stopping the rotor, when the centrifugal force matches the return force threshold, that causes the high abutment members to pass into the engagement position and causes the engagement latch to engage the high abutment members. Conversely, during a stage of starting the rotor and when using a disengagement latch, when the centrifugal force matches the centrifugal force threshold, that causes the high abutment members to pass into the disengagement position and causes the disengagement latch to engage the high abutment members.

More particularly, the centrifugal threshold and the return force threshold should be considered as being distinct previously-defined thresholds, in particular with respect to a break in the dependency between the rotor force threshold and the centrifugal force threshold. The centrifugal force threshold is significantly greater than the return force intrinsically generated by the return means against the centrifugal force generated by the first drive means at the centrifugal force threshold.

Conversely, and where applicable, the return force threshold is determined by the all or nothing retaining force generated by the disengagement latch on the basis of said means for evaluating the centrifugal force generated by the first drive means detecting that said force is equal to a freely-chosen return force threshold.

More particularly, the abutment mechanism includes inhibit means for inhibiting the engagement latch causing it to take up its inactive state at the centrifugal force threshold reached by the centrifugal force generated progressively by the first drive means.

The inhibit means for inhibiting the engagement latch may be formed in particular equally well by the first drive means, or by analogy by the means for evaluating the centrifugal force generated by the first drive means.

During a stage of starting the rotor, the centrifugal force increases until it reaches the centrifugal force threshold with the effect of causing the engagement latch to be inhibited and to pass from the active state to the inactive state. In a variant, the engagement latch is inhibited directly by the centrifugal force generated by the first drive means. In another variant, analogous to the first variant, the engagement latch is inhibited on the basis of using evaluation means for evaluating the centrifugal force generated by the first drive means.

Said inhibit means may also be means for inhibiting the disengagement latch on the basis of using means for evaluating the centrifugal force generated by the first drive means and detecting a centrifugal force that corresponds to the return force threshold.

Still more particularly, the abutment mechanism includes activation means for activating the engagement latch causing it to take up its active state at a centrifugal force corresponding to a predetermined latching force threshold that is no greater than the return force threshold.

A lessening of the centrifugal force occurs when the rotor is in a stage of stopping rotation. At the return force threshold, the high abutment members are driven towards the engagement position by the second drive means. The locking force threshold corresponds in particular to the return force generated by the means for returning the abutment members into the engagement position.

In the engagement position of the high abutment members, the engagement latch is placed in the active state, in particular by the co-operating locking members making up the engagement latch being put into mutual co-operation. In particular, such locking members engage with the high abutment members and with the hub, with the passage of the high abutment members into the engagement position spontaneously causing the locking members to be put into mutual co-operation.

By way of example, when using permanent effect magnetic means to form the engagement latch, the locking force threshold should be considered relative to a lessened centrifugal force allowing the co-operating permanent magnetic members making up such magnetic means to be put mutually into contact. This contact corresponds to the engagement latch passing to the active state, and is made possible under the effect of the high abutment members being driven into the engagement position by the second drive means.

Also by way of example when using electromagnetic means to form the engagement latch, the latching force threshold may correspond to the return force threshold on the basis of an appropriate magnetic power being generated by the electromagnetic means. Such an appropriate magnetic power causes the return means and the engagement latch to be put into co-operation to drive the high abutment members towards the engagement position as from the return force threshold. The passage of the high abutment members from the disengagement position to the engagement position takes place quickly when the engagement latch is used for driving the high abutment members into the engagement position.

The disengagement latch is advantageously constituted by electromagnetic means, analogous to the embodiment corresponding to the engagement latch.

More particularly, and in an advantageous embodiment, the activation means of the engagement latch are formed by the second drive means. During the stage in which the rotor is stopping, centrifugal force lessens. The centrifugal force thus reaches the return force threshold which has the effect of allowing the high abutment members to pass into the engagement position under the effect of the return force generated by the second drive means. The passage of the high abutment members into the engagement position spontaneously serves to activate the engagement latch and to pass it from the inactive state to the active state.

Still more particularly and in a variant in which the engagement latch is constituted by an electromagnet or an analogous locking member that is operated under control, the activation means make use of said means for evaluating the centrifugal force generated by the first drive means. An evaluation of the centrifugal force generated by the first drive means as being less than or equal to the return force threshold causes the engagement latch to be activated, thereby causing it to pass into the active state.

The use of means for activating an electromagnet or the like forming the disengagement latch can be transposed by analogy to the disengagement latch, with its operation depending on said means for evaluating the centrifugal force developed by the first drive means.

In particular, the engagement latch generates a retaining force for retaining the high abutment members in the engagement position against the centrifugal force generated by the first drive means. The retaining force corresponds to the value of the centrifugal force threshold minus the return force intrinsically generated by the return means at the centrifugal force threshold.

The centrifugal force threshold corresponds to the return force intrinsically generated by the return means at the centrifugal force threshold plus a predetermined engagement-retaining force generated by the engagement latch. The predetermined nature of the retaining force generated by the engagement latch is a function of a centrifugal force threshold that is acceptable with respect to preventing the flapping movement of the blades during a stage of starting the rotor, and with respect to a tolerance that is acceptable on the speed with which the return means extend at the centrifugal force threshold, as a function of the stiffness of the return means.

In an advantageous embodiment, the engagement latch, and where appropriate the disengagement latch, comprise magnetic means. More specifically, the engagement latch comprises first magnetic means and the disengagement latch comprises second magnetic means. The first or second magnetic means comprise an association of at least one set of co-operating magnetic members that are engaged respectively with the high abutment members and with the hub.

A preferred embodiment provides a structure for the engagement latch that is simplified, while nevertheless being effective. In this embodiment, the engagement latch comprises at least one magnet developing a permanent and intrinsic magnetic force corresponding to the retaining force.

Also by way of example, the engagement latch, and where appropriate, the disengagement latch comprises an electromagnet that operates under the dependency of control means for activating it and conversely for inhibiting it. The control means are in communication with means for evaluating the centrifugal force generated by the first drive means relative to the centrifugal force threshold.

The power generated by the electromagnet may be greater than the power that is just sufficient for generating the retaining device, the limitation of the retaining force generated by the latch, regardless of whether it is the engagement latch or the disengagement latch, being obtained by the control means inhibiting the latch.

By way of example, the evaluation means may comprise equally well means for measuring the speed and/or the acceleration with which rotation of the hub is driven. By way of example, such means may be formed by means for detecting the speed of the engine used for driving rotation of the rotor and/or by dynamometer means for measuring the speed of rotation and/or the acceleration of the rotor.

In a preferred embodiment, the abutment mechanism includes damper means for acting against any bounce phenomenon. Such a bounce phenomenon may be caused by instability of the return means as a consequence of the return means deforming rapidly, where this is induced by the high abutment members passing rapidly from the engagement position towards the disengagement position.

In an embodiment, the damper means are formed by damper members placed on a path corresponding to the movement of the high abutment members from the engagement position to the disengagement position.

In another embodiment, damper means are formed by a structural arrangement of the return means. More particularly, the damper means are incorporated in the return means.

In a particular embodiment, the abutment mechanism includes at least one bistable disengagement latch that selectively engages with the high abutment members between an active state of the disengagement latch and an inactive state of the disengagement latch. In the active state, the disengagement latch engages with the high abutment members and keeps them blocked in the disengagement position. In the inactive state, said engagement exerted by the disengagement latch with the high abutment members is broken, thereby leaving the high abutment members free to move independently relative to the disengagement latch.

Advantage may be taken of the disengagement latch for fitting it with the damper means.

The present invention also provides a rotorcraft rotor comprising a rotary wing having blades hinged on a rotor hub. The rotor of the present invention is recognizable mainly in that it is fitted with an abutment mechanism as described above, including at least one said latch, and more particularly an engagement latch or indeed in subsidiary manner a disengagement latch.

The rotorcraft rotor of the present invention is more particularly recognizable in that the high abutment members of abutment mechanism fitted thereto selectively engage with at least one said latch in an all or nothing manner.

Said latch is more particularly an engagement latch. The high abutment members are firmly engaged with the engagement latch in the engagement position of the high abutment members. In the disengagement position, the high abutment members are released from the engagement exerted by the engagement latch.

In subsidiary manner, a said latch is a disengagement latch. The high abutment members firmly engage with the disengagement latch when the high abutment members are in the disengagement position. In the engagement position, the high abutment members are released from the engagement exerted by the disengagement latch.

During a stage in which the rotor is being started, the engagement exerted by the engagement latch on the high abutment members continues until a determined threshold speed of rotation of the rotor that corresponds with the determined centrifugal force threshold. Since the centrifugal force produced by the first drive means has reached the centrifugal force threshold, this inhibits the engagement latch. The inhibition of the engagement latch causes the engagement latch to pass from the active state to the inactive state, thereby having the consequence of breaking the engagement exerted by the engagement latch with the high abutment members. The breaking of this engagement causes a break to the junction between the engagement latch and the high abutment member and allows the high abutment members to pass towards the disengagement position under the effect of the centrifugal force generated by the first drive means.

Conversely, during a stage of stopping the rotor and in the absence of the disengagement latch, the breaking of the engagement between the engagement latch and the high abutment members continues to a determined threshold for the speed of rotation of the rotor that corresponds with the predetermined return force threshold. Since the centrifugal force produced by the first drive means has then reached the return force threshold, the return means cause the high abutment members to pass into the engagement position until their arrival in the engagement position causes the engagement latch to be activated. Activating the engagement latch causes the engagement latch to pass from the inactive state to the active state, with the consequence of causing the engagement latch to engage with the high abutment members.

Since the engagement latch is made up of magnetic members having intrinsic and permanent magnetization, the passage of the engagement latch between one and the other of the active state and the inactive state takes place spontaneously as a function of the centrifugal force generated by the first drive means.

In an embodiment, the high abutment members are carried jointly by a rotary ring mounted coaxial on the hub. Each of said drive means engages the ring and the rotor hub, thereby selectively turning the ring in opposite directions between the engagement position and the disengagement position for the high abutment members. The ring is mounted to turn about the hub and selectively engages with the latch against its ability to move in rotation on the hub when the latch is in the active state. Said latch is in particular an engagement latch, but it could also be a disengagement latch, where appropriate.

In particular, the ring is fitted with one of the magnetic members of at least one said set of magnetic members included in the latch. The other magnetic member of said set of magnetic members is carried by the hub.

In another embodiment, the high abutment members of the abutment mechanism are individually movably mounted on the hub to tilt between the engagement position and the disengagement position. Each of the high abutment members individually engages selectively with an individual latch associated therewith against its ability to tilt on the hub while the latch is in the active state. A said latch is in particular an engagement latch, but it could also be a disengagement latch, where appropriate.

The individual latches together form said latch, the latch equally well being an engagement latch or a disengagement latch. The individual retaining forces generated by each of the individual latches are analogous between the individual latches. The individual latches are caused to pass between an active state and an inactive state on a simultaneous basis.

In particular, each high abutment member is fitted with one of the magnetic members of a said set of magnetic members included in the latch. The other magnetic member of said set of magnetic members is carried by the hub.

BRIEF DESCRIPTION OF THE SEVERAL VIEWS OF THE DRAWINGS

A diagrammatic embodiment of the present invention is described with reference to the figures of the accompanying sheets, in which:

FIGS. 1 and 2 are respectively an axial section view and a fragmentary plan view of an embodiment of a rotorcraft rotor fitted with a prior art abutment mechanism;

FIG. 3 is a view of another embodiment of a rotorcraft rotor fitted with a prior art abutment mechanism;

FIG. 4 is a graph diagrammatically showing the operating modes of a prior art abutment mechanism;

FIG. 5 is a combination of two graphs diagrammatically showing the operating modes of an abutment mechanism of the present invention in a preferred embodiment, respectively for scheme (a) while a rotorcraft rotor is being set into rotation, and for scheme (b) while the rotor is being brought to rest.

DETAILED DESCRIPTION OF THE INVENTION

Figure 6:
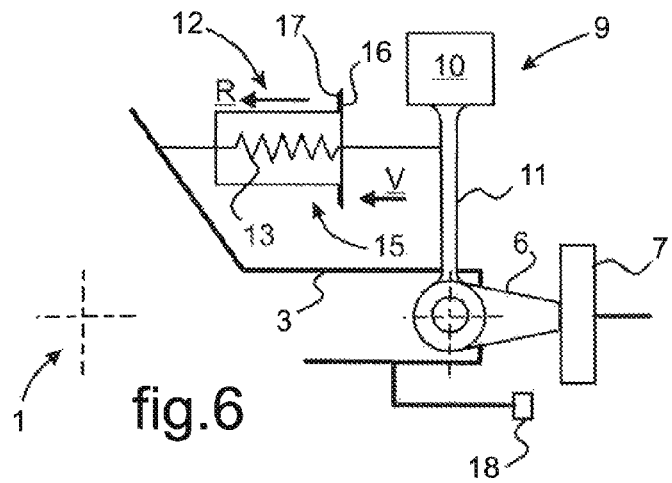
FIGS. 6 to 12 are diagrammatic illustrations of an embodiment of means for driving a high abutment member included in an abutment mechanism of the present invention, the abutment member being shown respectively in the engagement position in FIGS. 6, 7, 11 and 12, and in the at least partially disengaged position in FIGS. 8 to 10.

In FIGS. 1 to 3, a rotorcraft rotor 1 comprises a rotary wing having a plurality of blades 2. The blades 2 are hinge-mounted on a rotary hub 3 of the rotor 1 via respective mounting members 4. The hinges of the blades 2 on the hub 3 enable a pilot to vary the pitch of the blades 2 cyclically or collectively.

The rotor 1 has an abutment mechanism for limiting the flapping movement of the blades 2. The abutment mechanism comprises low abutment members 5 and high abutment members 6 that co-operate respectively with corresponding contact members 7 and 8 carried by the mounting members 4.

In FIGS. 2 and 3, the high abutment members 6 are mounted on the hub 3 to be retractable between an engagement position and a disengagement position. In the engagement position, the high abutment members 6 co-operate with the corresponding contact members 7 to limit the flapping movement of the blades 2. In the disengagement position, the high abutment members 6 are retracted to allow the blades 2 to move while the rotorcraft is in flight. The high abutment members 6 are pivotally hinged on the hub 3 and they are engaged by opposing drive means.

First drive means 9 make use of the centrifugal force generated by setting the rotor 1 into rotation to drive the high abutment members 6 into the disengagement position. The first drive means 9 comprise a set of flyweights 10 that exert centrifugal force on the high abutment members 6 under the effect of the centrifugal force developed by the rotor while rotating. The flyweights 10 are individually carried by respective lever arms 11 that are hinged on the hub 3. Second drive means 12 comprise return means 13 for returning the high abutment members 6 into the engagement position. The return means 13 are hinged on the hub 3 and they exert a return force on the high abutment members 6 against the centrifugal force generated by the flyweights 10.

In FIGS. 1 and 2, the high abutment members 6 are hinged individually on the hub 3, being in engagement with respective drive means 9 and 12. In FIG. 3, the high abutment members 6 are carried jointly by a ring 14 mounted coaxially on the hub 3. The ring 14 is in engagement with the drive means 9 and 12 which serves to cause the ring to pivot about the axis of the hub 3 so as to drive the high abutment members 6 jointly between the disengagement position and the engagement position.

FIGS. 4 and 5 show the modes of operation of an abutment mechanism fitted to a rotorcraft rotor, respectively in the prior art and in the present invention, with these modes of operation being shown diagrammatically by way of indication. Each of the schemes shown in the figures shows the behavior in deformation of the return means forming part of the high abutment mechanisms during stages in which the rotor is starting (Start) and stopping (Stop). The return means are used for causing the high abutment members included in the abutment mechanism to pass from a disengagement position to an engagement position.

The behavior of the return means is shown as a function of the speed of rotation of the rotor (revolutions per minute (rpm)) and as a function of the centrifugal force (C) generated by first drive means of the centrifugal force type as included respectively in the various abutment mechanisms to cause the high abutment members to go from the disengagement position to the engagement position.

In FIG. 4 and in scheme (a) of FIG. 5, the return means tend to deform during the starting stage (Start) under the effect of the centrifugal force developed at a predetermined centrifugal force threshold (SC). A transient stage of the high abutment members going from an engagement position towards a disengagement position is initiated. This transient stage extends over a duration that varies depending on the progress with which the rotor is driven in rotation.

A first transient force threshold corresponds to the centrifugal force threshold (SC) at which the drive of the high abutment members towards a disengagement position is initiated. A second transient force threshold corresponds to a centrifugal force from which the looked-for escape of the abutment members into the disengagement position is actually obtained. This second transient force threshold corresponds to a return force threshold (SR).

In FIG. 4, the return means tend to deform progressively once the centrifugal force generated by the first drive means corresponds to the centrifugal force threshold (SC). The progression of the deformation of the return means is substantially constant between the two deformation levels that correspond to the centrifugal force threshold (SC) and the return force threshold (SR).

Figure 12:
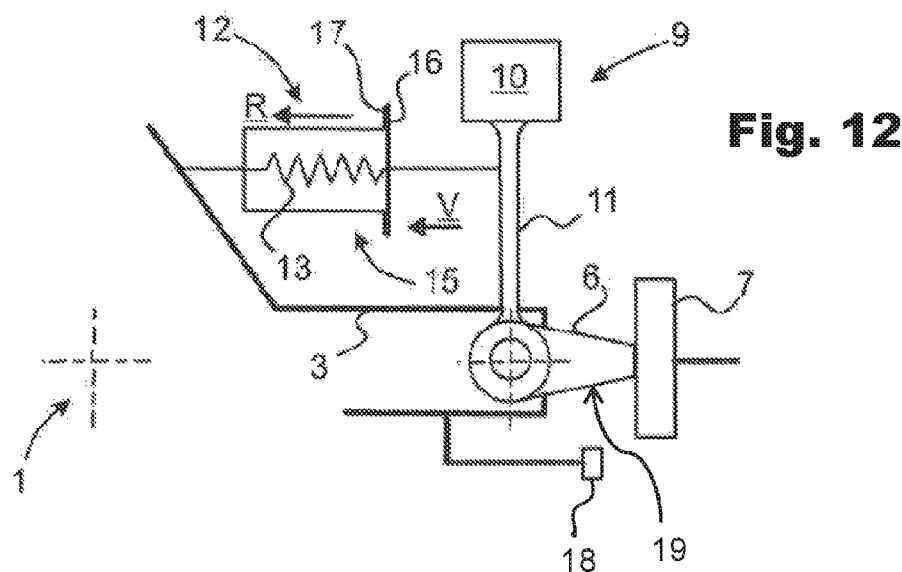

In the scheme (a) of FIG. 5, a latch is used to block the high abutment members in the engagement position. In the embodiments of the invention shown in the figures, the abutment mechanism has only one latch, this latch being an engagement latch. It is also possible to fit a disengagement latch that is used to block the high engagement members in the disengagement position, as shown in FIG. 12. Under such circumstances, the operating modes of such a disengagement latch can easily be obtained by analogous transposition from the operating modes of the engagement latch.

An active state of the latch is maintained until the centrifugal force generated by the first drive means matches the centrifugal force threshold (SC). In the active state, the latch prevents the return means from deforming. At the centrifugal force threshold (SC) the latch is deactivated so as to cause it to pass to an inactive state. In the inactive state, the latch releases the high abutment members from being blocked in the engagement position.

At the centrifugal force threshold (SC) the return means deform suddenly over a deformation range of the return means as represented by (o). Thereafter, the return means deform progressively over the deformation range of the return means represented by (p), starting from a determined centrifugal force that depends on the stiffness selected for the return means.

In FIG. 4, for given stiffness of the return means, the value of the return force threshold (SR) depends on the value of the centrifugal force threshold (SC).

In the scheme (a) of FIG. 5, curves $\underline{k}$ and k' show two respective variants of the deformation of the return means depending on the respective stiffnesses selected for them. By comparing the curves $\underline{k}$ and k', it can be seen that the respective values for the return force thresholds (SR) and (SR') differ for respective stiffnesses of the return means and for the same centrifugal force threshold (SC). A break of dependency is obtained between the centrifugal force threshold (SC) and the return force threshold (SR, SR').

The stiffness of the return means as shown is adapted in particular depending on the various approaches described above in the description of the present invention. The remarkable points and the various ranges (o), (p), and (q), of the curves $\underline{k}$ and k' need to be adapted in particular depending on the results that are to be obtained, given those different approaches.

The relative values of the speed of rotation of the rotor and of the centrifugal force to be taken as a reference for the curves $\underline{k}$ and k' should be taken into consideration depending on the characteristics of the rotor on which the abutment mechanism of the present invention is installed.

In the scheme (a) of FIG. 5, it can be seen that there is a bounce phenomenon in a deformation range of the return means, as shown at (q). This bounce phenomenon may be of greater or smaller extent depending on the stiffness selected for the return means. The instability of the return means when deforming under the effect of being released suddenly by the latch can give rise to such a bounce phenomenon. In order to attenuate this bounce phenomenon, it is possible to take advantage of the stiffness of the return means.

In FIG. 4, and in the scheme (b) of FIG. 5, the return force threshold (SR) corresponds to a centrifugal force that lessens while the rotor is stopping. From the return force threshold (SR), the return means intrinsically generate a return force suitable for driving the high abutment members from the disengagement position towards an engagement position.

The engagement position of the high abutment members is obtained from a lessening of the centrifugal force that corresponds to a predetermined rest threshold (S) of the return means. The rest threshold (S) corresponds to a rest station of the return means, in which the high abutment members are in the engagement position. The return force intrinsically generated by the return means at the rest threshold (S) depends on the force required for holding the high abutment members in the engagement position that needs to be generated by the return means.

In FIG. 4, the behavior of the return means is analogous and inverted between the starting stage (Start) and the stopping stage (Stop). The centrifugal force threshold corresponds to the rest threshold (S). At the rest threshold (S), the return force generated intrinsically by the return means is necessarily suitable for holding the high abutment members in the engagement position.

In FIG. 5, on comparing the scheme (a) with the scheme (b), it can be seen that the respective behaviors of the return means during the starting stage (Start) and the stopping stage (Stop) are distinct. The latch is used for blocking the high abutment members in the engagement position at the rest threshold. The return force generated intrinsically by the return means at the rest threshold (S) may be arbitrary, without affecting the blocking of the high abutment members in the engagement position.

In FIGS. 6 to 11, the diagrams show the specific ways in which a high abutment member hinged to a rotorcraft rotor hub is set into movement in the present invention.

With a rotor of the kind shown in FIGS. 1 to 3, the high abutment member 6 is hinged to the hub 3 and is engaged with the drive means 9, 12 to cause it to be driven between the engagement position and the disengagement position. The high abutment member 6 is carried by a lever arm 11 that is fitted with a flyweight 10 forming the first drive means 9 generating the centrifugal force. The return means 13 forming the second drive means 12 are hinged to the hub 3 and engaged with the lever arm 11 in order to exert a return force against the centrifugal force generated by the flyweights 10.

Figure 7:
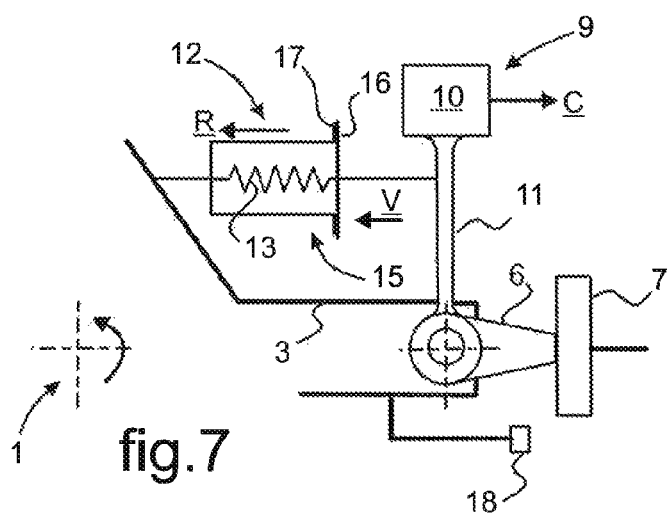
Figure 8:
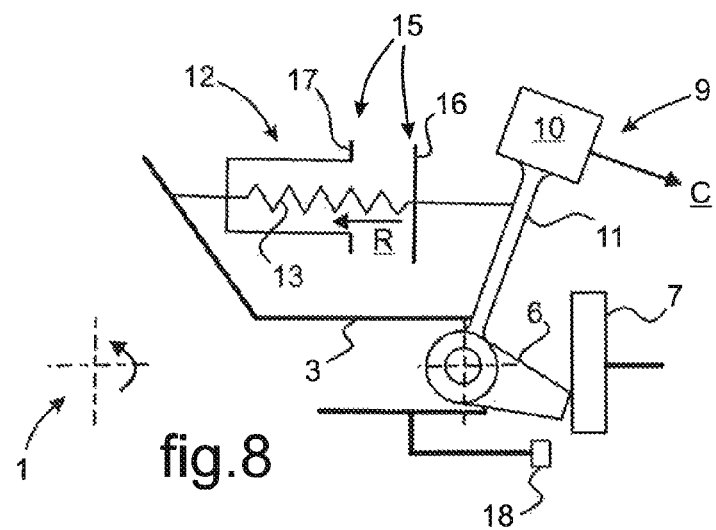
Figure 9:
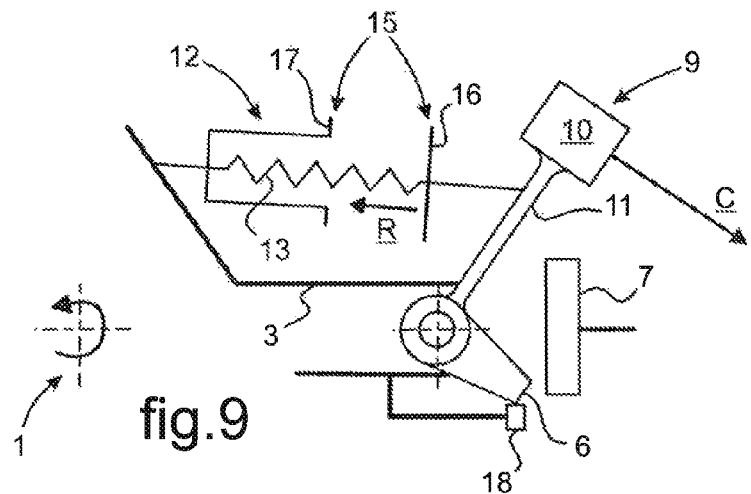
Figure 10:
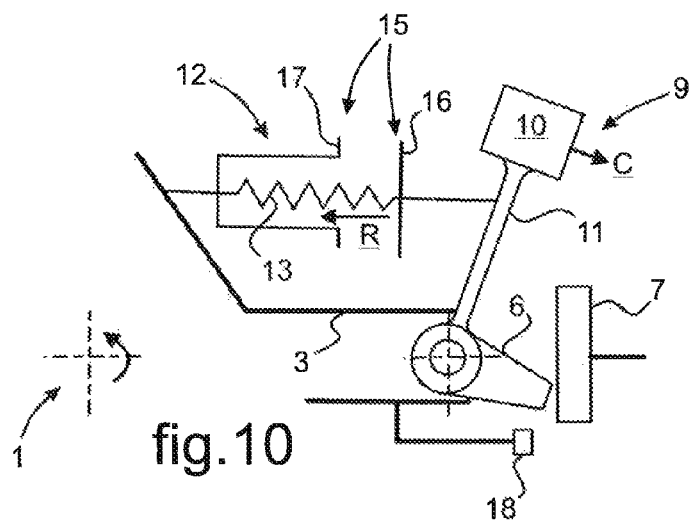
Figure 11:
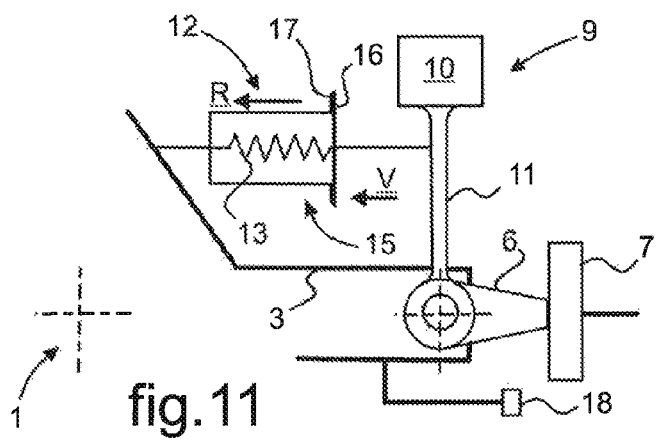

In the engagement position, as shown in FIGS. 6, 7, and 11, the high abutment member 6 is in engagement with a contact member 7. In the disengagement position as shown in FIGS. 8 to 10, the high abutment member 6 is released from the contact member 7.

A bistable latch 15 is interposed between the hub 3 and the high abutment member 6. The latch 15 has magnetic means associating a set of two co-operating magnetic members 16 and 17. The magnetic members 16 and 17 are carried respectively by the hub 3 and by the high abutment member 6. In the diagrams shown, one magnetic member 16 is carried by the high abutment member 6 via the lever arm 11. Other analogous configurations for connecting the high abutment member 6 with the latch 15 could be used.

In the embodiment shown, at least one of the magnetic members 16 and 17 is formed by a permanent magnet that develops a magnetic force that is permanent and intrinsic. The other magnetic member 16 or 17 may be formed by a co-operating permanent magnet or by a metallic mass.

In FIGS. 6 and 11, the rotor 1 is stationary. No centrifugal force is developed by the rotor 1 so the flyweight 10 does not exert any centrifugal force on the lever arm 11. The return means 13 spontaneously contract into position retaining the lever arm 11, developing an intrinsic return force R. The latch 15 engages the high abutment member 6 and develops a retaining force V that holds the high abutment member 6 firmly in the engagement position. The state of the return means 13 should be matched with the rest threshold S shown in the scheme (b) of FIG. 5.

In FIG. 7, the rotor 1 is starting and it has begun to rotate. The flyweight 10 exerts a centrifugal force C on the lever arm 11, which force is less than a predetermined centrifugal force threshold. The high abutment member 6 is firmly held in the engagement position by the latch 15, being engaged with the contact member 7.

The return means 13 are held in a contracted position, with the latch 15 engaging the high abutment member 6 constituting an obstacle to the return means 13 lengthening. The return means 13 exert a return force R on the high abutment member, which return force is in addition to the retaining force V generated by the latch 15, thereby constituting an obstacle to the high abutment member 6 passing towards the disengagement position.

The state of return means 13 should be matched with the range (u) shown in scheme (a) of FIG. 5. The range (u) illustrates the state of the return means 13 while the centrifugal force being exerted on the high abutment means by the first drive means is increasing between the rest threshold (S) and the centrifugal force threshold (SC).

In FIG. 8, the rotor 1 is at a speed of rotation that corresponds to a predetermined rotation threshold of the rotor 1, beyond which the high abutment member 6 needs to be driven into the disengagement position. The centrifugal force C generated by the flyweight 10 corresponds to the centrifugal force threshold that is equivalent to the sum of the return force R plus the retaining force V. Driving of the high abutment member 6 from the engagement position towards the disengagement position is initiated in a transient stage.

The co-operation between the magnetic members 16 and 17 is broken, with the effect of giving rise to an instantaneous break in the engagement exerted by the latch 15 on the high abutment member 6. The latch 15 releases the high abutment member 6 suddenly towards the disengagement position. Since the return force R is significantly smaller than the centrifugal force C by a difference approximately equal to the intrinsic retaining force V on the latch 15, the return means 13 extend rapidly. The duration of the transient stage is limited as well as possible, depending on a selected compromise depending on the difference between the return force R and the centrifugal force threshold.

Figure 13:
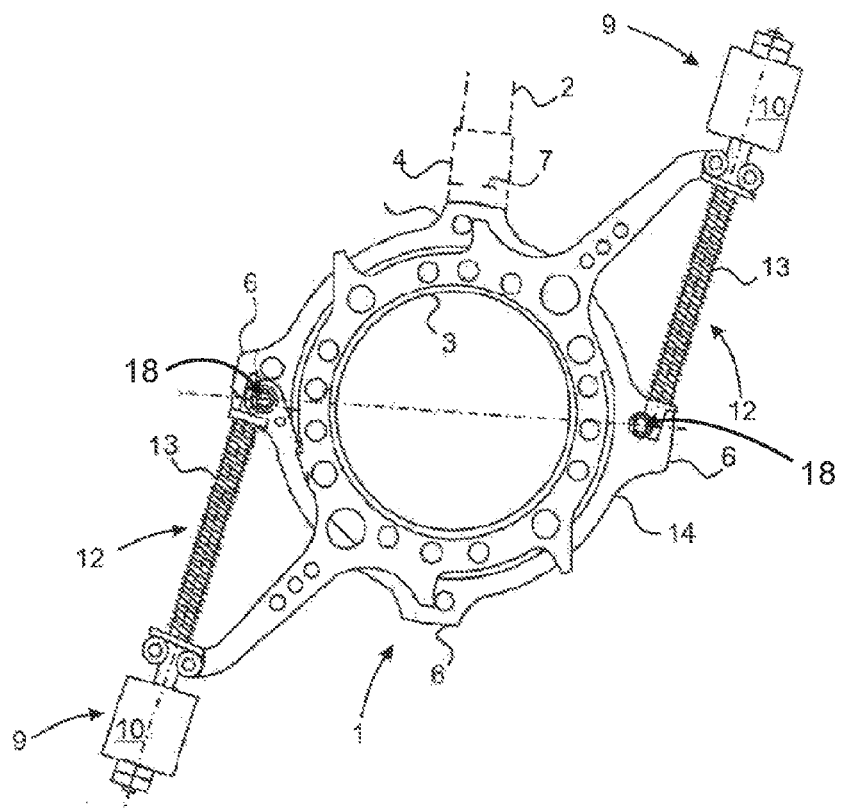
FIG. 13 is a view of another embodiment of a rotorcraft rotor fitted with an abutment mechanism where the damper means are incorporated in the return means.

With reference to the scheme (a) in FIG. 5, the state of the return means 13 should be matched with the ranges (o) and (q). In order to attenuate the bounce phenomenon (q), the abutment mechanism may include specific damper means 18. In the embodiment of the abutment mechanism shown in FIGS. 6 to 11, such damper means 18 are formed, for example, by a flexible mass carried by the hub 3. In another embodiment, illustrated in FIG. 13, the damper means are incorporated in the return means.

In FIG. 9, the rotor is driven at nominal power and the centrifugal force generated by the flyweight 10 has gone beyond the centrifugal force threshold. The high abutment members 6 are held in the disengagement position under the effect of the centrifugal force C generated by the flyweight 10. The state of the return means 13 should be matched with the return force threshold (SR) as shown in the scheme (a) of FIG. 5.

In FIG. 10, the rotor 1 is in a stopping stage and the centrifugal force it generates gives rise to a lessening of the centrifugal force C. The centrifugal force C begins by crossing the return force threshold, so the high abutment member 6 is no longer held in the disengagement position. The return means 13 deform progressively against the centrifugal force C in order to return to their natural state, as shown in scheme (b) of FIG. 5.

In FIG. 11, the centrifugal force C is not sufficient to prevent the high abutment member 6 from passing towards the engagement position under the effect of the return force R generated by the return means 13. The magnetic members 16 and 17 come back into co-operation, with the effect of causing the latch 15 to be put into engagement with the high abutment member 6 and to be held firmly in the engagement position, as shown in FIG. 4.

What is claimed is:

1. An abutment mechanism for a rotorcraft rotor having a rotary wing comprising a plurality of blades, the blades being individually hinged to a hub of the rotor via respective mounting members, the abutment mechanism comprising:

abutment members that are mounted on the hub and that co-operate with first members carried by the hub including low abutment members and high abutment members between which the individual flapping path of a blade associated therewith is limited;

the high abutment members being movably mounted on the hub to move between an engagement position in which the high abutment members co-operate with corresponding contact members constituting an obstacle to the upward flapping path of the blades, and a disengagement position in which the high abutment members are retracted leaving the upward flapping path of the blades free;

the abutment mechanism comprising drive means for driving the high abutment members between the engagement position and the disengagement position, the drive means comprising first drive means and second drive means developing opposing forces causing the high abutment members to pass respectively towards the disengagement position and towards the engagement position;

the first drive means making use of centrifugal force to generate a centrifugal force (C) causing the high abutment members to pass towards the disengagement position as from a predetermined centrifugal force threshold (SC); and the second drive means comprising return means that generate a spontaneous return force (R) for returning the high abutment members towards the engagement position against the centrifugal force (C) generated by the first drive means, the return means causing the high abutment members to pass towards the engagement position as from a predetermined return force threshold (SR) corresponding to a predetermined lessening of the centrifugal force (C) generated by the first drive means;

wherein the abutment mechanism comprises at least one bistable engagement latch that selectively engages the high abutment members between an active state of the engagement latch in which the engagement latch engages with the high abutment members that it keeps blocked in the engagement position, and an inactive state of the engagement latch in which the engagement is broken allowing the high abutment members free to move independently relative to the engagement latch; and wherein the centrifugal threshold (SC) and the return force threshold (SR) are distinct previously-defined thresholds, and the centrifugal force threshold is significantly greater than the return force (R) intrinsically generated by the return means against the centrifugal force (C) generated by the first drive means at the centrifugal force threshold (SC).

2. The abutment mechanism according claim 1, wherein the engagement latch takes up its inactive state at the centrifugal force threshold (SC) reached by the centrifugal force (C) that is progressively generated.

3. The abutment mechanism according to claim 2, further including inhibit means comprising the first drive means for inhibiting the engagement latch causing it to take up its inactive state at the centrifugal force threshold (SC) reached by the centrifugal force (C) that is progressively generated by the first drive means.

4. The abutment mechanism according to claim 1, including activation means for activating the engagement latch causing it to take up its active state at a centrifugal force (C) corresponding to a predetermined latching force threshold that is no greater than the return force threshold (SR).

5. The abutment mechanism according to claim 1, wherein the engagement latch generates a retaining force (V) for retaining the high abutment members in the engagement position against the centrifugal force (C) generated by the first drive means, the retaining force (V) corresponding to the value of the centrifugal force threshold (SC) minus the return force (R) intrinsically generated by the return means at the centrifugal force threshold (SC).

6. The abutment mechanism according to claim 1, wherein the engagement latch comprises first magnetic means associating at least one set of co-operating magnetic members that are engaged respectively with the high abutment members and with the hub.

7. The abutment mechanism according to claim 6, wherein the engagement latch generates a retaining force (V) for retaining the high abutment members in the engagement position against the centrifugal force (C) generated by the first drive means, and wherein the engagement latch comprises at least one of the magnetic members developing a permanent and intrinsic magnetic force corresponding to the retaining force (V).

8. The abutment mechanism according to claim 6, wherein the engagement latch comprises an electromagnet that operates under the dependency of control means for activating it and conversely for inhibiting it, the control means being in communication with means for evaluating the centrifugal force (C) generated by the first drive means relative to the centrifugal force threshold.

9. The abutment mechanism according to claim 1, wherein the abutment mechanism includes damper means against the bounce phenomenon (Q) induced by the high abutment members passing rapidly from the engagement position towards the disengagement position.

10. The abutment mechanism according to claim 9, wherein the damper means are formed by damper members placed on a path corresponding to the movement of the high abutment members from the engagement position to the disengagement position.

11. The abutment mechanism according to claim 9, wherein the damper means are integrated in the return means.

12. The abutment mechanism according to claim 1, including at least one bistable disengagement latch that selectively engages the high abutment members between an active state of the disengagement latch in which the disengagement latch engages with the high abutment members that it keeps blocked in the disengagement position, and an inactive state of the disengagement latch in which the engagement is broken leaving the high abutment members free to move independently relative to the disengagement latch.

13. A rotorcraft rotor having a rotary wing comprising blades hinged to a hub of the rotor, the rotorcraft rotor comprising:

an abutment mechanism for a rotorcraft rotor having a rotary wing comprising a plurality of blades, the blades being individually hinged to a hub of the rotor via respective mounting members, the abutment mechanism comprising:

abutment members that are mounted on the hub and that co-operate with first members carried by the hub including low abutment members and high abutment members between which the individual flapping path of a blade associated therewith is limited;

the high abutment members being movably mounted on the hub to move between an engagement position in which the high abutment members co-operate with corresponding contact members constituting an obstacle to the upward flapping path of the blades, and a disengagement position in which the high abutment members are retracted leaving the upward flapping path of the blades free;

the abutment mechanism comprising drive means for driving the high abutment members between the engagement position and the disengagement position, the drive means comprising first drive means and second drive means developing opposing forces causing the high abutment members to pass respectively towards the disengagement position and towards the engagement position;

the first drive means making use of centrifugal force to generate a centrifugal force (C) causing the high abutment members to pass towards the disengagement position as from a predetermined centrifugal force threshold (SC); and the second drive means comprising return means that generate a spontaneous return force (R) for returning the high abutment members towards the engagement position against the centrifugal force (C) generated by the first drive means, the return means causing the high abutment members to pass towards the engagement position as from a predetermined return force threshold (SR) corresponding to a predetermined lessening of the centrifugal force (C) generated by the first drive means, wherein the rotor includes at least one bistable engagement latch that selectively engages the high abutment members between an active state of the engagement latch in which the engagement latch engages with the high abutment members that it keeps blocked in the engagement position, and an inactive state of the engagement latch in which the engagement is broken allowing the high abutment members free to move independently relative to the engagement latch; and wherein the centrifugal threshold (SC) and the return force threshold (SR) are distinct previously-defined thresholds, and the centrifugal force threshold is significantly greater than the return force (R) intrinsically generated by the return means against the centrifugal force (C) generated by the first drive means at the centrifugal force threshold (SC).

14. The rotorcraft rotor according to claim 13, wherein the high abutment members are carried jointly by a rotary ring mounted coaxial on the hub, the ring selectively engaging the latch against its ability to move in rotation in the active state of the latch.

15. The rotorcraft rotor according to claim 14, the engagement latch comprising at least one set of co-operating magnetic members that are engaged respectively with the high abutment members and with the hub, and wherein the ring is fitted with a first one of the magnetic members of the at least one set of magnetic members included in the latch, a second one of the magnetic members of the set of magnetic members being carried by the hub.

16. The rotorcraft rotor according to claim 13, wherein the high abutment members are individually movably mounted on the hub to tilt between the engagement position and the disengagement position, each of the high abutment members being individually engaged selectively with an individual latch associated therewith against its ability to tilt on the hub while the latch is in the active state.

17. The rotorcraft rotor according to claim 15, wherein the at least one set of co-operating magnetic members comprises a plurality of sets of co-operating magnetic members, and wherein each high abutment member is fitted with a first one of the magnetic members of a respective set of the plurality of sets of magnetic members included in the latch and a second one of the magnetic members of a respective set of the plurality of sets of magnetic members being carried by the hub.

18. An abutment mechanism for a rotorcraft rotor having a rotary wing comprising a plurality of blades, the blades being individually hinged to a hub of the rotor via respective mounting members, the abutment mechanism comprising:

abutment members that are mounted on the hub and that co-operate with first members carried by the hub including low abutment members and high abutment members between which the individual flapping path of a blade associated therewith is limited;

the high abutment members being movably mounted on the hub to move between an engagement position in which the high abutment members co-operate with corresponding contact members constituting an obstacle to the upward flapping path of the blades, and a disengagement position in which the high abutment members are retracted leaving the upward flapping path of the blades free;

the abutment mechanism comprising drive means for driving the high abutment members between the engagement position and the disengagement position, the drive means comprising first drive means and second drive means developing opposing forces causing the high abutment members to pass respectively towards the disengagement position and towards the engagement position;

the first drive means making use of centrifugal force to generate a centrifugal force (C) causing the high abutment members to pass towards the disengagement position as from a predetermined centrifugal force threshold (SC); and the second drive means comprising return means that generate a spontaneous return force (R) for returning the high abutment members towards the engagement position against the centrifugal force (C) generated by the first drive means, the return means causing the high abutment members to pass towards the engagement position as from a predetermined return force threshold (SR) corresponding to a predetermined lessening of the centrifugal force (C) generated by the first drive means;

wherein the abutment mechanism comprises at least one bistable engagement latch that selectively engages the high abutment members between an active state of the engagement latch in which the engagement latch engages with the high abutment members that it keeps blocked in the engagement position, and an inactive state of the engagement latch in which the engagement is broken allowing the high abutment members free to move independently relative to the engagement latch, wherein the centrifugal threshold (SC) and the return force threshold (SR) are distinct previously-defined thresholds, and the centrifugal force threshold is significantly greater than the return force (R) intrinsically generated by the return means against the centrifugal force (C) generated by the first drive means at the centrifugal force threshold (SC), further including inhibit means for inhibiting the engagement latch causing it to take up its inactive state at the centrifugal force threshold (SC) reached by the centrifugal force (C) generated progressively by the first drive means.

19. An abutment mechanism for a rotorcraft rotor having a rotary wing comprising a plurality of blades individually hinged to a hub of the rotor via respective mounting members, the abutment mechanism comprising:

abutment members on the hub that co-operate with low abutment members and high abutment members between which the individual flapping path of a blade associated therewith is limited;

the high abutment members being movably mounted on the hub to move between an engagement position in which the high abutment members co-operate with corresponding contact members constituting an obstacle to the upward flapping path of the blades, and a disengagement position in which the high abutment members are retracted;

the abutment mechanism comprising a driver to drive the high abutment members between the engagement position and the disengagement position, the driver comprising a first driver and a second driver developing opposing forces causing the high abutment members to pass respectively towards the disengagement position and towards the engagement position;

the first driver making use of centrifugal force to generate a centrifugal force (C) causing the high abutment members to pass towards the disengagement position as from a predetermined centrifugal force threshold (SC); and the second driver comprising a return driver that generate a spontaneous return force (R) for returning the high abutment members towards the engagement position against the centrifugal force (C) generated by the first driver, the return driver causing the high abutment members to pass towards the engagement position as from a predetermined return force threshold (SR) corresponding to a predetermined lessening of the centrifugal force (C) generated by the first driver;

wherein the abutment mechanism comprises at least one bistable engagement latch that selectively engages the high abutment members between an active state of the engagement latch in which the engagement latch engages with the high abutment members, and an inactive state of the engagement latch in which the engagement is broken;

wherein the centrifugal threshold (SC) and the return force threshold (SR) are distinct previously-defined thresholds, and the centrifugal force threshold is greater than the return force (R) intrinsically generated by the return driver against the centrifugal force (C) generated by the first driver at the centrifugal force threshold (SC).

* * * * *